United States Patent
Heinz, II et al.

(10) Patent No.: US 10,601,885 B2
(45) Date of Patent: *Mar. 24, 2020

(54) ADAPTIVE SCENE COMPLEXITY BASED ON SERVICE QUALITY

(71) Applicant: Amazon Technologies, Inc., Seattle, WA (US)

(72) Inventors: Gerard Joseph Heinz, II, Seattle, WA (US); Jonathan Paul Thompson, Seattle, WA (US); Venelin Nikolaev Efremov, Trabuco Canyon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,606

(22) Filed: Mar. 20, 2017

(65) Prior Publication Data

US 2017/0195390 A1 Jul. 6, 2017

Related U.S. Application Data

(63) Continuation of application No. 14/076,821, filed on Nov. 11, 2013, now Pat. No. 9,634,942.

(51) Int. Cl.
*H04L 29/06* (2006.01)
*H04L 12/851* (2013.01)
(Continued)

(52) U.S. Cl.
CPC .......... *H04L 65/602* (2013.01); *A63F 13/355* (2014.09); *H04L 47/24* (2013.01);
(Continued)

(58) Field of Classification Search
CPC ...... A63F 13/355; A63F 13/358; A63F 13/12; A63F 2300/534; A63F 2300/538;
(Continued)

(56) References Cited

U.S. PATENT DOCUMENTS

| | | | |
|---|---|---|---|
| 4,090,221 A * | 5/1978 | Connor | .................... H04N 5/21 348/618 |
| 5,390,188 A | 2/1995 | Dawson | |

(Continued)

FOREIGN PATENT DOCUMENTS

| | | |
|---|---|---|
| CN | 1154169 A | 7/1997 |
| CN | 101025901 A | 8/2007 |

(Continued)

OTHER PUBLICATIONS

European Patent Application No. 14860565.2; Extended Search Report; dated May 10, 2017; 9 pages.

(Continued)

*Primary Examiner* — Sargon N Nano
(74) *Attorney, Agent, or Firm* — BakerHostetler

(57) ABSTRACT

Content, such as a video game, may be delivered by a content provider to a destination using, for example, streaming content delivery techniques. The transmission of the content may be monitored in order to determine transmission conditions such as a quality of the network connection from the content provider to the destination. The determined transmission conditions may then be used to determine adjustments to a complexity of various scenes associated with the content. For example, in some cases, when transmission conditions are unfavorable, scenes may be adjusted by reducing a complexity of the scenes.

11 Claims, 9 Drawing Sheets

(51) Int. Cl.
*H04L 12/853* (2013.01)
*H04L 12/811* (2013.01)
*H04L 29/08* (2006.01)
*H04N 21/647* (2011.01)
*H04N 21/81* (2011.01)
*H04N 21/24* (2011.01)
*H04N 21/2662* (2011.01)
*A63F 13/355* (2014.01)
*H04N 21/4402* (2011.01)
*H04N 21/478* (2011.01)

(52) U.S. Cl.
CPC .......... *H04L 47/2416* (2013.01); *H04L 47/38* (2013.01); *H04L 65/4092* (2013.01); *H04L 65/80* (2013.01); *H04L 67/2823* (2013.01); *H04N 21/2402* (2013.01); *H04N 21/2662* (2013.01); *H04N 21/4402* (2013.01); *H04N 21/4781* (2013.01); *H04N 21/64792* (2013.01); *H04N 21/816* (2013.01); *H04N 21/8146* (2013.01); *H04L 65/4069* (2013.01)

(58) Field of Classification Search
CPC ......... A63F 2300/407; A63F 2300/577; H04L 67/38; H04L 65/605; H04L 65/1069; H04L 29/06; H04L 65/602; H04L 65/80; H04L 65/4069; H04N 19/132; H04N 19/61; H04N 19/172; H04N 19/107; H04N 21/2343; H04N 19/436; H04N 21/2402; H04N 21/234363; H04N 21/234381; H04N 21/6587; H04N 21/4223; H04N 19/53; H04N 21/478; H04N 21/4781; G08B 13/19656
See application file for complete search history.

(56) References Cited

U.S. PATENT DOCUMENTS

| | | | |
|---|---|---|---|
| 5,475,817 A | 12/1995 | Waldo et al. | |
| 5,774,668 A | 6/1998 | Choquier et al. | |
| 5,956,489 A | 9/1999 | San Andreas et al. | |
| 6,343,313 B1 | 1/2002 | Salesky et al. | |
| 6,351,467 B1 | 2/2002 | Dillon | |
| 6,525,731 B1 | 2/2003 | Suits et al. | |
| 6,556,206 B1 | 4/2003 | Benson et al. | |
| 6,694,346 B1 | 2/2004 | Aman et al. | |
| 6,941,078 B1 | 9/2005 | Onaka | |
| 7,068,729 B2 | 6/2006 | Shokrollahi et al. | |
| 7,177,448 B1 | 2/2007 | Sah | |
| 7,249,291 B2 | 7/2007 | Rasmussen et al. | |
| 7,447,235 B2 | 11/2008 | Luby et al. | |
| 7,522,167 B1 | 4/2009 | Diard et al. | |
| 7,548,242 B1 | 6/2009 | Hughes et al. | |
| 7,616,206 B1 | 11/2009 | Danilak | |
| 7,616,207 B1 | 11/2009 | Diard et al. | |
| 7,623,131 B1 | 11/2009 | Johnson | |
| 7,660,245 B1 | 2/2010 | Luby | |
| 7,711,068 B2 | 5/2010 | Shokrollahi et al. | |
| 7,720,174 B2 | 5/2010 | Shokrollahi et al. | |
| 7,721,184 B2 | 5/2010 | Luby et al. | |
| 7,956,772 B2 | 6/2011 | Shokrollahi et al. | |
| 7,969,444 B1 | 6/2011 | Biermann et al. | |
| 7,984,179 B1 | 7/2011 | Huang | |
| 8,065,676 B1 | 11/2011 | Sahai et al. | |
| 8,185,809 B2 | 5/2012 | Luby et al. | |
| 8,190,760 B2 | 5/2012 | Hurst et al. | |
| 8,279,755 B2 | 10/2012 | Luby | |
| 8,458,567 B2 | 6/2013 | Luby et al. | |
| 8,473,557 B2 | 6/2013 | Ramakrishnan et al. | |
| 8,478,816 B2 | 7/2013 | Parks et al. | |
| 8,484,284 B2 | 7/2013 | Elliott et al. | |
| 8,527,646 B2 | 9/2013 | Khatib et al. | |
| 8,572,251 B2 | 10/2013 | Srinivas et al. | |
| 8,574,074 B2 * | 11/2013 | van Datta | A63F 13/12 463/31 |
| 8,582,299 B1 | 11/2013 | Phillips et al. | |
| 8,671,163 B2 | 3/2014 | Luby et al. | |
| 8,795,076 B2 * | 8/2014 | van Datta | A63F 13/12 463/1 |
| 8,838,722 B2 | 9/2014 | Ridges et al. | |
| 8,928,659 B2 | 1/2015 | Bar-Zeev et al. | |
| 8,996,864 B2 | 3/2015 | Maigne et al. | |
| 9,170,961 B2 | 10/2015 | Das et al. | |
| 9,192,859 B2 | 11/2015 | Perlman et al. | |
| 9,338,226 B2 | 5/2016 | Korangy et al. | |
| 9,466,074 B2 * | 10/2016 | van Datta | A63F 13/12 |
| 9,940,647 B2 * | 4/2018 | Perry | G06Q 30/0277 |
| 2002/0039371 A1 | 4/2002 | Hedayat et al. | |
| 2002/0114404 A1 | 8/2002 | Aizawa et al. | |
| 2002/0129159 A1 | 9/2002 | Luby et al. | |
| 2002/0147611 A1 | 10/2002 | Greene et al. | |
| 2002/0173984 A1 | 11/2002 | Robertson et al. | |
| 2002/0176367 A1 | 11/2002 | Gross | |
| 2003/0091000 A1 | 5/2003 | Chu et al. | |
| 2003/0105925 A1 | 6/2003 | Yoshimura et al. | |
| 2003/0212742 A1 | 11/2003 | Hochmuth et al. | |
| 2004/0057379 A1 | 3/2004 | Chen et al. | |
| 2004/0073903 A1 | 4/2004 | Melchione et al. | |
| 2004/0093206 A1 | 5/2004 | Hardwick | |
| 2004/0098748 A1 | 5/2004 | Bo et al. | |
| 2004/0101274 A1 | 5/2004 | Foisy et al. | |
| 2004/0153316 A1 | 8/2004 | Hardwick | |
| 2004/0236547 A1 | 11/2004 | Rappaport et al. | |
| 2005/0135305 A1 | 6/2005 | Wentink | |
| 2006/0036756 A1 | 2/2006 | Driemeyer et al. | |
| 2006/0061651 A1 | 3/2006 | Tetterington | |
| 2006/0072831 A1 | 4/2006 | Pallister | |
| 2006/0088093 A1 | 4/2006 | Lakaniemi et al. | |
| 2006/0092847 A1 | 5/2006 | Mohan | |
| 2006/0168147 A1 | 7/2006 | Inoue et al. | |
| 2006/0285489 A1 | 12/2006 | Francisco et al. | |
| 2007/0009043 A1 | 1/2007 | Craig et al. | |
| 2007/0053692 A1 | 3/2007 | Hoshida et al. | |
| 2007/0094094 A1 | 4/2007 | Yaron et al. | |
| 2007/0140359 A1 | 6/2007 | Ehret et al. | |
| 2007/0156725 A1 | 7/2007 | Ehret et al. | |
| 2007/0183493 A1 | 8/2007 | Kimpe | |
| 2007/0216776 A1 | 9/2007 | Woolfe | |
| 2007/0226364 A1 | 9/2007 | Landspurg | |
| 2007/0240160 A1 | 10/2007 | Paterson-Jones et al. | |
| 2007/0265073 A1 | 11/2007 | Novi et al. | |
| 2008/0007650 A1 | 1/2008 | Bennett | |
| 2008/0008093 A1 | 1/2008 | Wang et al. | |
| 2008/0104608 A1 | 5/2008 | Hyser et al. | |
| 2008/0172140 A1 | 7/2008 | Kim et al. | |
| 2008/0281793 A1 | 11/2008 | Mathur | |
| 2009/0015671 A1 * | 1/2009 | Addy | H04N 7/181 348/143 |
| 2009/0081964 A1 * | 3/2009 | Buznach | A63F 13/12 455/90.1 |
| 2009/0124387 A1 | 5/2009 | Perlman et al. | |
| 2009/0131177 A1 | 5/2009 | Pearce | |
| 2009/0150750 A1 | 6/2009 | Liu et al. | |
| 2009/0195537 A1 | 8/2009 | Qiu et al. | |
| 2009/0216364 A1 | 8/2009 | Grissom | |
| 2009/0245426 A1 | 10/2009 | Ratnakar et al. | |
| 2009/0249440 A1 | 10/2009 | Platt et al. | |
| 2009/0251488 A1 | 10/2009 | Clavel | |
| 2009/0307565 A1 | 12/2009 | Luby et al. | |
| 2010/0017686 A1 | 1/2010 | Luby et al. | |
| 2010/0063992 A1 | 3/2010 | Ma et al. | |
| 2010/0064102 A1 | 3/2010 | Brown et al. | |
| 2010/0088453 A1 | 4/2010 | Solki et al. | |
| 2010/0091669 A1 | 4/2010 | Liu et al. | |
| 2010/0110634 A1 | 5/2010 | Woodbury, II et al. | |
| 2010/0156892 A1 | 6/2010 | Chan et al. | |
| 2010/0166058 A1 | 7/2010 | Perlman et al. | |
| 2010/0166063 A1 | 7/2010 | Perlman et al. | |
| 2010/0166065 A1 | 7/2010 | Perlman et al. | |
| 2010/0166068 A1 | 7/2010 | Perlman et al. | |
| 2010/0169958 A1 * | 7/2010 | Werner | G06F 21/36 726/6 |

(56) References Cited

U.S. PATENT DOCUMENTS

| | | |
|---|---|---|
| 2010/0214940 A1 | 8/2010 | Macauley |
| 2010/0218014 A1 | 8/2010 | Bozek et al. |
| 2010/0289803 A1 | 11/2010 | Klosowski et al. |
| 2010/0312891 A1 | 12/2010 | Pairault et al. |
| 2011/0002377 A1 | 1/2011 | Raveendran |
| 2011/0002378 A1 | 1/2011 | Raveendran |
| 2011/0002379 A1 | 1/2011 | Raveendran |
| 2011/0002399 A1 | 1/2011 | Raveendran |
| 2011/0002405 A1 | 1/2011 | Raveendran |
| 2011/0040396 A1 | 2/2011 | Kraemer et al. |
| 2011/0040894 A1 | 2/2011 | Shrum et al. |
| 2011/0047263 A1 | 2/2011 | Martins et al. |
| 2011/0055372 A1 | 3/2011 | Elyashev et al. |
| 2011/0055602 A1 | 3/2011 | Kamay et al. |
| 2011/0067072 A1 | 3/2011 | Parekh et al. |
| 2011/0125746 A1 | 5/2011 | Leary et al. |
| 2011/0126110 A1 | 5/2011 | Vilke et al. |
| 2011/0134111 A1 | 6/2011 | Stone |
| 2011/0149751 A1 | 6/2011 | Li et al. |
| 2011/0157193 A1 | 6/2011 | Boucher et al. |
| 2011/0252181 A1 | 10/2011 | Ouye et al. |
| 2011/0252356 A1 | 10/2011 | Morris |
| 2011/0276689 A1 | 11/2011 | Rosen |
| 2011/0283045 A1 | 11/2011 | Krishnan et al. |
| 2011/0304634 A1 | 12/2011 | Urbach |
| 2011/0317568 A1 | 12/2011 | Flinta et al. |
| 2012/0004040 A1 | 1/2012 | Pereira et al. |
| 2012/0004041 A1 | 1/2012 | Pereira et al. |
| 2012/0004042 A1 | 1/2012 | Perry et al. |
| 2012/0005316 A1 | 1/2012 | Perry et al. |
| 2012/0069036 A1 | 3/2012 | Dharmapurikar |
| 2012/0084774 A1 | 4/2012 | Post et al. |
| 2012/0089980 A1 | 4/2012 | Sharp et al. |
| 2012/0093252 A1 | 4/2012 | Strait |
| 2012/0117145 A1 | 5/2012 | Clift et al. |
| 2012/0141089 A1 | 6/2012 | Hunt |
| 2012/0154389 A1 | 6/2012 | Bohan et al. |
| 2012/0173715 A1 | 7/2012 | Selitser et al. |
| 2012/0182387 A1 | 7/2012 | Enenkl et al. |
| 2012/0188233 A1* | 7/2012 | Shuster ............... G06T 15/20 345/419 |
| 2012/0188341 A1 | 7/2012 | Klien et al. |
| 2012/0192031 A1 | 7/2012 | Liu et al. |
| 2012/0206572 A1 | 8/2012 | Russell |
| 2012/0209933 A1 | 8/2012 | Ridges et al. |
| 2012/0213272 A1* | 8/2012 | Liu ..................... H04N 19/132 375/240.02 |
| 2012/0224490 A1 | 9/2012 | Ikada |
| 2012/0227058 A1 | 9/2012 | Hunt |
| 2012/0268553 A1 | 10/2012 | Talukder |
| 2012/0281715 A1 | 11/2012 | Shojania et al. |
| 2012/0281962 A1 | 11/2012 | Hunt et al. |
| 2012/0311448 A1 | 12/2012 | Achour et al. |
| 2012/0331147 A1 | 12/2012 | Dutta et al. |
| 2013/0007499 A1 | 1/2013 | Moy |
| 2013/0016107 A1 | 1/2013 | Dharmapurikar |
| 2013/0024812 A1 | 1/2013 | Reeves et al. |
| 2013/0031161 A1 | 1/2013 | Yang |
| 2013/0036476 A1 | 2/2013 | Roever et al. |
| 2013/0038618 A1 | 2/2013 | Urbach |
| 2013/0067469 A1 | 3/2013 | Das et al. |
| 2013/0069946 A1* | 3/2013 | Venon .................. A61B 5/00 345/428 |
| 2013/0106855 A1 | 5/2013 | Urbach |
| 2013/0151683 A1 | 6/2013 | Jain et al. |
| 2013/0151803 A1 | 6/2013 | Tofano |
| 2013/0210522 A1 | 8/2013 | Dharmapurikar |
| 2013/0212477 A1 | 8/2013 | Averbuch |
| 2013/0227710 A1 | 8/2013 | Barak et al. |
| 2013/0263131 A1 | 10/2013 | Beda, III et al. |
| 2013/0266292 A1* | 10/2013 | Sandrew ............... H04N 9/79 386/282 |
| 2013/0281791 A1 | 10/2013 | Aferzon |
| 2013/0282791 A1 | 10/2013 | Kruglick |
| 2013/0306269 A1 | 11/2013 | Helbig et al. |
| 2013/0307847 A1* | 11/2013 | Dey .................... G06T 1/00 345/419 |
| 2013/0322517 A1 | 12/2013 | Zurpal et al. |
| 2013/0326024 A1 | 12/2013 | Chen et al. |
| 2013/0344960 A1 | 12/2013 | Perry et al. |
| 2013/0344961 A1 | 12/2013 | Iannetta |
| 2013/0344966 A1* | 12/2013 | Mustafa ............... A63F 13/79 463/42 |
| 2013/0346899 A1 | 12/2013 | Cole et al. |
| 2014/0025710 A1 | 1/2014 | Sarto |
| 2014/0108967 A1 | 4/2014 | Markham et al. |
| 2014/0143301 A1 | 5/2014 | Watson et al. |
| 2014/0171186 A1 | 6/2014 | Arnone et al. |
| 2014/0173060 A1 | 6/2014 | Jubran et al. |
| 2014/0173674 A1 | 6/2014 | Wolman et al. |
| 2014/0176536 A1 | 6/2014 | Kern et al. |
| 2014/0176583 A1 | 6/2014 | Abiezzi et al. |
| 2014/0213191 A1 | 7/2014 | Courtice |
| 2014/0216688 A1 | 8/2014 | Shelnutt et al. |
| 2014/0267283 A1 | 9/2014 | Nystad et al. |
| 2014/0279581 A1 | 9/2014 | Devereaux et al. |
| 2014/0297798 A1 | 10/2014 | Bakalash et al. |
| 2014/0337835 A1 | 11/2014 | Johnson |
| 2014/0364228 A1* | 12/2014 | Rimon .................. A63F 13/12 463/32 |
| 2014/0379775 A1 | 12/2014 | Korangy et al. |
| 2015/0019965 A1 | 1/2015 | Roberts et al. |
| 2015/0023404 A1 | 1/2015 | Li et al. |
| 2015/0084981 A1 | 3/2015 | Clarberg |
| 2015/0091903 A1 | 4/2015 | Costello et al. |
| 2015/0130789 A1 | 5/2015 | Heinz et al. |
| 2015/0130813 A1 | 5/2015 | Taraki et al. |
| 2015/0130814 A1* | 5/2015 | Taraki ................. G06T 11/40 345/441 |
| 2015/0130815 A1 | 5/2015 | Taraki et al. |
| 2015/0131969 A1 | 5/2015 | Taraki et al. |
| 2015/0133214 A1* | 5/2015 | Heath ................. A63F 13/355 463/31 |
| 2015/0133216 A1* | 5/2015 | Heinz, II ............. A63F 13/355 463/31 |
| 2015/0134771 A1 | 5/2015 | Kalman et al. |
| 2015/0134772 A1 | 5/2015 | Heinz et al. |
| 2015/0134779 A1 | 5/2015 | Thompson et al. |
| 2015/0134840 A1 | 5/2015 | Thompson et al. |
| 2015/0142925 A1 | 5/2015 | Hix et al. |
| 2015/0187333 A1 | 7/2015 | Loeffler et al. |
| 2015/0200983 A1 | 7/2015 | Pearce et al. |
| 2015/0229693 A1* | 8/2015 | Clark ................. H04L 65/602 345/611 |
| 2015/0249623 A1 | 9/2015 | Phillips et al. |
| 2015/0281258 A1 | 10/2015 | Watkins et al. |
| 2015/0331813 A1 | 11/2015 | Perrin et al. |
| 2016/0012465 A1 | 1/2016 | Sharp et al. |
| 2016/0044125 A1 | 2/2016 | Hardin et al. |
| 2016/0073286 A1 | 3/2016 | Wang et al. |
| 2017/0300368 A1 | 10/2017 | Jain et al. |

FOREIGN PATENT DOCUMENTS

| | | |
|---|---|---|
| CN | 102867073 A | 1/2013 |
| EP | 2073486 A1 | 6/2009 |
| EP | 1290642 B1 | 9/2010 |
| JP | 2000-132705 A | 5/2000 |
| JP | 2004-266575 A | 9/2004 |
| JP | 2006-061716 A | 3/2006 |
| JP | 2006-279544 A | 10/2006 |
| JP | 2007-011494 A | 1/2007 |
| JP | 2009-003584 A | 1/2009 |
| JP | 2010-176662 A | 8/2010 |
| JP | 2010-224914 A | 10/2010 |
| JP | 2011-511367 A | 4/2011 |
| JP | 2012-069011 A | 4/2012 |
| JP | 2012-143012 A | 7/2012 |
| JP | 2012-245347 A | 12/2012 |
| WO | WO 2012/079825 A1 | 6/2012 |

(56) References Cited

FOREIGN PATENT DOCUMENTS

| WO | WO 2012/107739 A2 | 8/2012 |
| WO | WO 2013/069654 A1 | 5/2013 |

OTHER PUBLICATIONS

Hasselgren et al.; "An Efficient Multi-View Rasterization Architecture"; Proceedings of the 17$^{th}$ Eurographics Conf. on Rendering Techniques; Jun. 2006; 12 pages.

Sorbier et al.; "GPU-based multi-view rendering"; 3$^{rd}$ Annual Int'l Conf. on Computer Games, Multimedia and Allied Technology (CGAT); 2010; 8 pages.

Hubner et al.; "Single-Pass Multi-View Rendering"; IADIS Int'l Journal on Computer Science and Information Systems; vol. 2 No. 2; 2007; p. 122-140.

European Patent Application No. 14860984.5; Extended Search Report; dated May 26, 2017; 14 pages.

"Remote Session Environment"; https://technet.microsoft.com/de-de/library/ee791847(y=ws.10).aspx; Microsoft; © 2017; accessed Jul. 18, 2017; 8 pages.

European Patent Application No. 14859905.3; Extended Search Report; dated Jun. 27, 2017; 10 pages.

U.S. Appl. No. 14/317,441, filed Jun. 27, 2014, Kalman et al.

http://commons.wikimedia.org/wiki/File:Stereoscopic_3D_render_from_Blender.jpg; File: Stereoscopic 3D render from Blender.jpg;Wikimedia; Mar. 4, 2012; accessed Nov. 12, 2013; 2 pages.

http://en.wikipedia.org/wiki/Mipmap; Mipmap; Wikipedia; Oct. 29, 2013; accessed Nov. 10, 2013; 3 pages.

http://en.wikipeida.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

Ekelin et al.; "Real-Time Measurement of End-to-End Available Bandwidth using Kalman Filtering"; Proc. 10$^{th}$ IEEE/IFIP Network Operations and Management Symposium; 2006; 12 pages.

\* cited by examiner

ADAPTIVE SCENE COMPLEXITY BASED ON SERVICE QUALITY

CROSS-REFERENCE TO RELATED APPLICATIONS

This application is a continuation of U.S. application Ser. No. 14/076,821 filed Nov. 11, 2013, entitled "ADAPTIVE SCENE COMPLEXITY BASED ON SERVICE QUALITY", the entirety of which is incorporated herein by reference.

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. Patent Application No. 61/902,740 filed Nov. 11, 2013, entitled "EFFICIENT BANDWIDTH ESTIMATION".

BACKGROUND

Recent technological advances have improved the ability to transmit and deliver information in a fast and efficient manner. In accordance with such advances, it is becoming increasingly popular to acquire and store data at a central provider location and to deliver the data to end users quickly upon request. This model may employ technological concepts such as multimedia streaming, in which multimedia content may be constantly received by and presented to an end user while being delivered by a provider. One rapidly expanding area is the use of streaming technology to deliver graphics content such as video games. When streaming graphics content, a provider may access the requested graphics content, render the graphics content from scenes into images, and then encode and transmit the images to an end user over a network such as the Internet. The term scene, as used herein, refers to a representation that may be used in association with generation of an image.

While streaming and other content delivery technology provides many benefits, any model that relies on transmission of data across a network may necessarily be subject to at least some of the drawbacks associated with network communications. Such drawbacks may include, for example, reductions or changes in available bandwidth due to network congestion or other problems. These and other drawbacks may affect both the transmission speed and the quality of the delivered content. End users may become quickly frustrated when they receive content at lower speed or lower quality than expected. In some cases, such disruptions may affect the user experience to such a degree that the content becomes at least temporarily unusable. End users of content such as video games, which often require continual user interaction and rapid response, may be particularly sensitive to reductions and disruptions in delivery quality.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

In general, this disclosure describes techniques for adaptive scene complexity based on quality of service. In accordance with the disclosed techniques, one or more items of content, such as a video game, may be delivered by a content provider to a destination using, for example, streaming content delivery techniques. The transmission of the content may be monitored in order to determine transmission conditions such as a quality of the network connection from the content provider to the destination. The determined transmission conditions may then be used to determine adjustments to a complexity of various scenes associated with the content. For example, in some cases, when transmission conditions are unfavorable, scenes may be adjusted by reducing a complexity of the scenes. This may allow, for example, images generated based on the adjusted scenes to be transmitted at a faster frame rate than might otherwise be available without complexity adjustment. This may also allow, for example, images generated based on the adjusted scenes to maintain a higher display quality than might otherwise be available without complexity adjustment.

The complexity of a scene may be reduced using various techniques. For example, in some cases, one or more objects may be removed from the scene. Additionally, for example, a level of intricacy associated with one or more objects may be reduced. In some cases, scene complexity may be reduced by lowering a distance of visibility from a point-of-view associated with the scene. Additionally, in some cases, scene complexity may be reduced by lowering a level of movement with respect to a prior scene. Any combination of these or other appropriate techniques may also be employed.

In some cases, a content item may have associated complexity information that assists in determining how to adjust the scene complexity. The complexity information may, for example, provide information regarding a relative interest and/or a relative intricacy associated with various objects within a scene. Objects may then be removed from the scene or have their intricacy reduced based on the complexity information. For example, in some cases, a priority may be set to remove or reduce intricacy of objects that have both low interest and high intricacy. Additionally, in some cases, adjustments to scene complexity may be determined by observing changes in image quality associated with adjustments to prior scenes. For example, if it is observed that an object was removed from a scene and that the resulting image has a high image quality, then, in some cases, it may be estimated that the object has a high level of intricacy. By contrast, if it is observed that an object was removed from a scene and that the resulting image has a low image quality, then, in some cases, it may be estimated that the object has a low level of intricacy.

Figure 1:
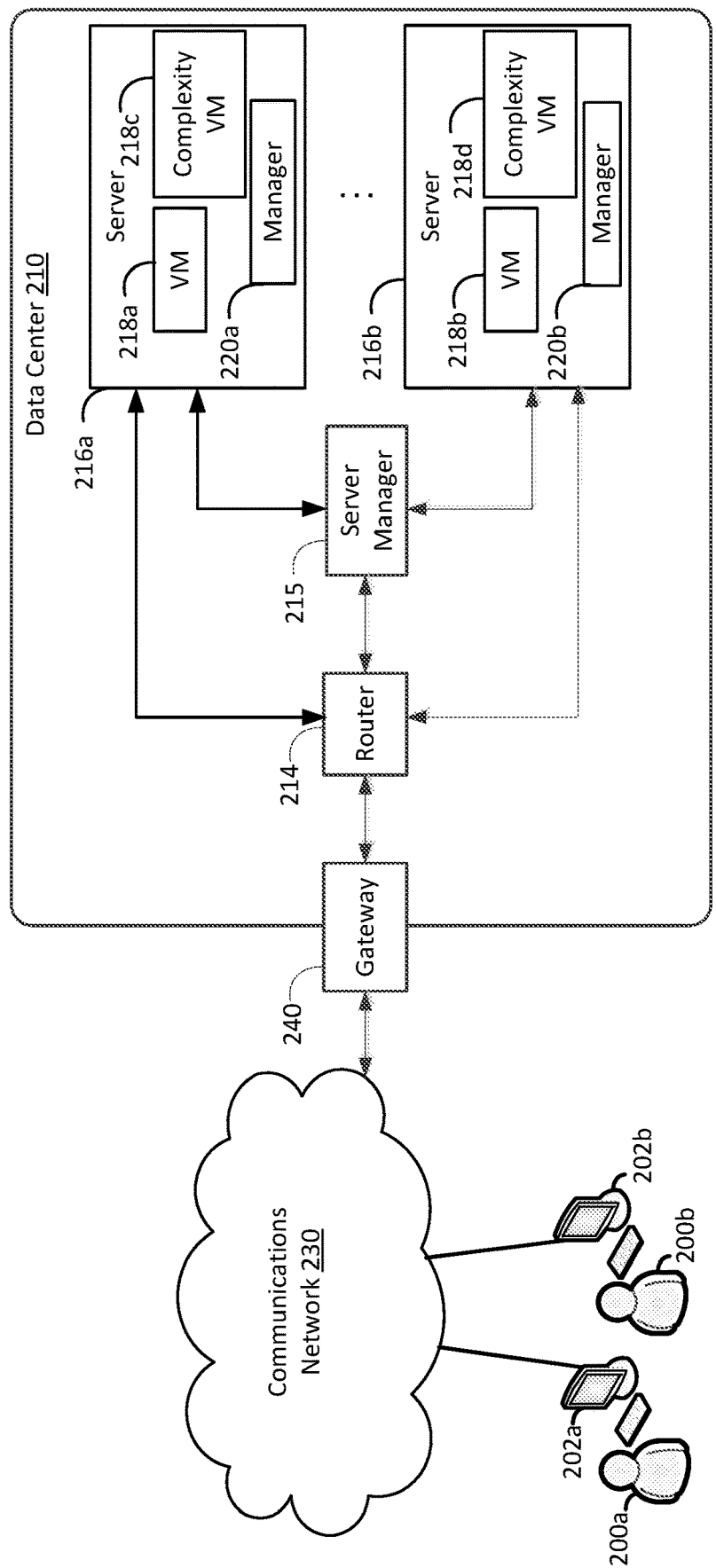
FIG. 1 is a diagram illustrating an example computing system that may be used in some embodiments.

As set forth above, a content provider may provide content to a destination over a network such as the Internet. Content may, in some cases, be provided upon request to a destination using, for example, streaming content delivery techniques. An example computing environment that enables providing of information to a destination will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a-b (which may be referred herein singularly as server 216 or in the plural as servers 216) that provide computing resources. These resources may be available as bare metal resources, or as virtual machine instances 218a-d and (which may be referred herein singularly as virtual machine instance 218 or in the plural as virtual machine instances 218). Virtual machine instances 218c and 218d are complexity virtual machine instances. The complexity virtual machine instances 218c and 218d may be configured to perform all or any portion of the scene complexity adjustment techniques in accordance with the present disclosure and described in detail below. As should be appreciated, while the particular example illustrated in FIG. 1 includes one complexity virtual machine in each server, this is merely an example. A server may include more than one complexity virtual machine or may not include any complexity virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
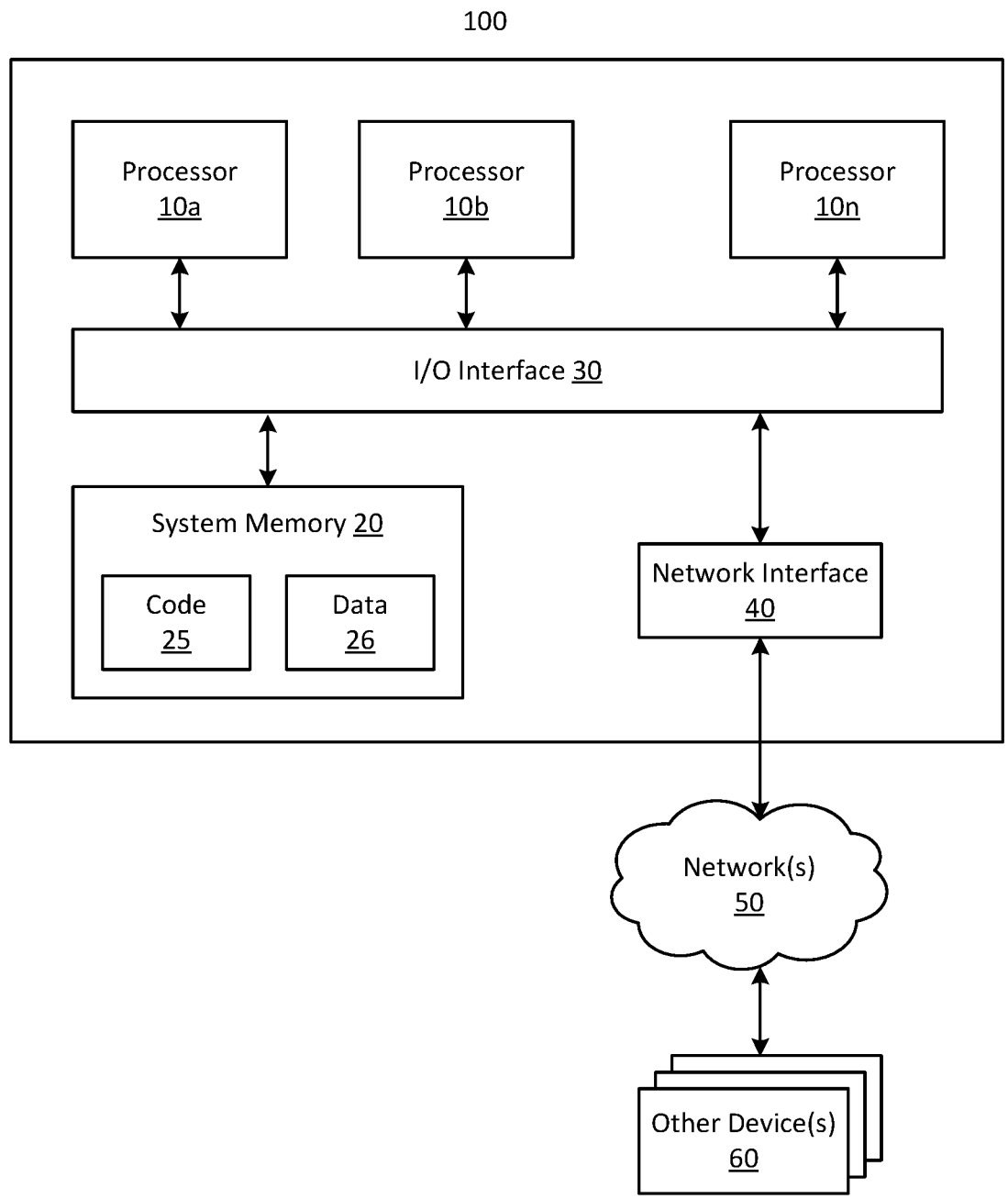
FIG. 2 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a,

10*b* and/or 10*n* (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 100 via I/O interface 30. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium such as a network and/or a wireless link, such as those that may be implemented via network interface 40. Portions or all of multiple computing devices such as those illustrated in FIG. 2 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, a content provider may provide content to a destination. A content provider may, for example, provide a content delivery service that may reside on one or more servers. The service may be scalable to meet the demands of one or more customers and may increase or decrease in capability based on the number and type of incoming client requests. The content delivery service may, in some cases, process a content item in parallel across multiple nodes of the content delivery service. This may be done, in one embodiment, to reduce the latency for rendering the content item. Portions of the content delivery service may also be migrated to be placed in a position of reduced latency with a requesting client. In some cases, the content provider may determine an "edge" of a system or network associated with the content provider that is physically and/or logically closest to a requesting client. The content provider may then, for example, "spin-up," migrate resources, or otherwise employ components associated with the determined edge for interacting with requests from the client. Such an edge determination process may, in some cases, provide an efficient technique for identifying and employing components that are well suited to interact with a particular client, and may, in some embodiments, reduce the latency for communications between a content provider and one or more clients.

The term content, as used herein, refers to any information that is presentable to one or more users, and the term content item, as used herein, refers to any collection of any such information. For example, content items may, in some cases, include graphics content items such as video games. In some cases, the disclosed techniques may be employed with respect to two-dimensional content, which, as used herein, refers to content that may be represented in accordance with two-dimensional scenes. In some other cases, the disclosed techniques may be employed with respect to three-dimensional content, which, as used herein, refers to content that may be represented in accordance with three-dimensional scenes. The two-dimensional or three-dimensional scenes may, for example, be considered logical representations in the sense that they may not physically occupy the areas that they are intended to logically model or represent. A scene may, for example, include or otherwise be associated with information or data that describes the scene. When content is eventually presented to end users, the scenes may be used to generate resulting images for display to the end users. The images may be generated by way of a process commonly referred to as rendering, which may, for example, incorporate concepts such as depth, reflection, shading and others. An image may include, for example, information associated with a displayable output, such as information associated with various pixel values and/or attributes.

Figure 3:
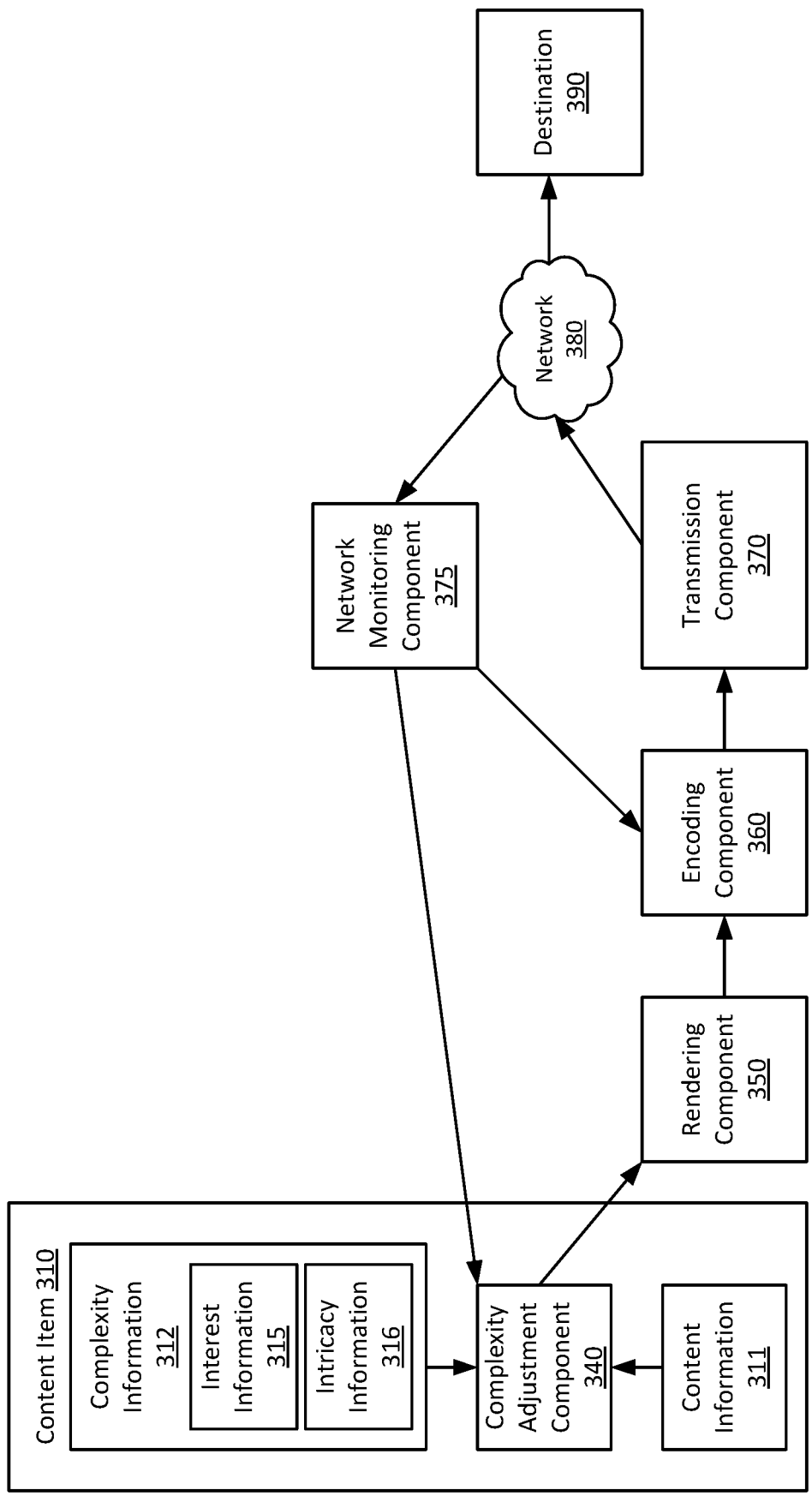
FIG. 3 is a diagram illustrating an example content provider system that may be used in some embodiments.

As also set forth above, content may be provided to destinations by employing, for example, streaming content delivery, in which content may be constantly received by and presented by a destination while being delivered by a provider. FIG. 3 is a diagram illustrating an example content provider system in accordance with the present disclosure. As should be appreciated, the directional arrows shown in FIG. 3 are merely intended to represent some example portions of data flow between components. Thus, data may flow in opposite directions and may also flow between components for which arrows are not specifically depicted.

As shown in FIG. 3, a particular content item 310, such as a video game, may be delivered to a destination 390. Content item 310 has associated content information 311, which may include, for example, any data that is used to generate a resulting image transmitted to destination 390. Content information 311 may include, for example, two-dimensional or three dimensional scenes that are used to generate resulting two-dimensional images.

Data associated with content information 311 may be provided to a rendering component 350, which may use the data to generate resulting two-dimensional images for transmission to destination 390. Rendering component 350 may, for example, include a graphics processing unit. Rendering component 350 may, for example, generate resulting two-dimensional images based on two-dimensional or three-dimensional scenes. Rendering component 350 may perform well known operations such as lighting, shading, clipping, transformation, scan conversion, rasterization, texturing and fragment shading. Essentially, the output of rendering component 350 may be a two-dimensional image that may be provided to encoding component 360. An image may include, for example, a collection of information associated with a displayable output.

Encoding component 360 is a component that encodes video images for transmission over a network 380 such as the Internet. Encoding component 360 may perform any appropriate techniques for encoding of images. Encoding component 360 or another component may also perform other appropriate transmission related operations such as data compression. After being encoded by encoding component 360, an image may be provided to transmission component 370 for transmission over network 380 to destination 390.

As set forth above, various network conditions may cause the quality of service for network transmission to vary over time. A network monitoring component 375 may be provided to monitor or otherwise observe network conditions in order to determine network feedback information. Such network feedback information may, for example, include or assist with a determination of a current network quality of service. The network feedback information may include, for example, any information related to changes in available bandwidth, latency, congestion and other factors. The network feedback information may include, for example, information that may be used to determine available bitrate constraints associated with an image. In some cases, the network feedback information may include a determination of information related to total bytes and packets that may be received by the particular destination 390. Network monitoring component 375 may, for example, employ various algorithms within a network transport layer of transmission component 370 in order to determine the network feedback information. In some cases, in addition to monitoring current and/or recent network conditions, network monitoring component 375 may also, for example, monitor and store historical network monitoring data in order to help predict upcoming network conditions.

Network monitoring component 375 may provide the collected network feedback information to complexity adjustment component 340. As should be appreciated, complexity adjustment component 340 need not necessarily be a separate component distinguishable from other components depicted in FIG. 3. For example, in some cases, some or all of the functionality performed by complexity adjustment component 340 may be performed externally to content item 310 and may be integrated into rendering component 350 and/or any other appropriate components.

Complexity adjustment component 340 may use the network feedback information to dynamically adjust the complexity of scene information that is provided to rendering component 350 and used to generate images for transmission to destination 390. For example, in some cases, when transmission conditions are unfavorable, scenes may be adjusted by reducing a complexity of the scenes. This may allow, for example, images generated based on the adjusted scenes to be transmitted at a faster frame rate than might otherwise be available without complexity adjustment. This may also allow, for example, images generated based on the adjusted scenes to maintain a higher display quality than might otherwise be available without complexity adjustment.

The complexity of a scene may generally be adjusted by changing one or more features of the scene. Features of the scene may include, for example, all or portions of one or more objects of a scene such as characters, scenery, assets, areas, groups of one or more pixels, background and others. Features of the scene may also include, for example, attributes of objects such as, for example, colors, textures, size, parts, surfaces, seasons, lighting, shading, reflection, level of detail, level of visibility or other attributes. Features may also include, for example, associated objects. For example, a tree may have associated objects such as leaves or birds. Features of the scene may also include, for example, audio associated with the scene.

As set forth above, the complexity of a scene may be reduced using various techniques. For example, in some cases, one or more objects may be removed from the scene. Additionally, for example, a level of intricacy associated with one or more objects may be reduced. In some cases, scene complexity may be reduced by lowering a distance of visibility from a point-of-view associated with the scene. Additionally, in some cases, scene complexity may be reduced by lowering a level of movement with respect to a prior scene. Any combination of these or other appropriate techniques may also be employed.

Also, in some cases, scene complexity may be reduced by removing or changing audio associated with the scene. In some cases, audio associated with a scene may be problematic in the sense that it may be particularly revealing of a low quality of network service. For example, a low quality of network service may sometimes cause audio to be at least partially interrupted or to become partially unsynchronized with associated video. In these and other cases, it may be desirable to adjust audio complexity as an alternative or in addition to video complexity.

The intricacy of an object or area may be reduced using any number of appropriate techniques. In some cases, the intricacy of an object or area may be reduced by reducing the intricacy of colors and/or textures associated with the object. For example, a cloth with detailed pattern that includes different shapes and colors may have its intricacy reduced by changing it into a plain white cloth. Additionally, in some cases, the intricacy of an object or area may be reduced by changing various attributes of the object. For example, birds and/or leaves may be removed from branches of a tree. As another example, plates, glasses and silverware may be removed from the top of a table.

In some cases, complexity adjustment component 340 may adjust the complexity of a scene based on complexity information 312. Complexity information 312 may include, for example, any appropriate information that may assist with adjusting the complexity of a scene associated with content item 310. Although FIG. 3 depicts complexity information 312 as being included as part of a content item 310, complexity information 312 may also be accessed externally to content item 310. Additionally, although FIG. 3 depicts complexity information 312 as including interest information 315 and intricacy information 316, complexity information need not necessarily include either or both of interest information 315 and intricacy information 316 and may also include any other appropriate information that may assist with adjusting the complexity of a scene associated with content item 310. Complexity information 312 may, in some cases, be generated by developers or creators of the content item 310 or other individuals with a detailed knowledge and understanding of the content item 310.

Interest information 315 may include, for example, information that identifies a level of interest associated with various objects or areas within a scene. Objects with higher interest may include, for example, objects with which a user may be likely to interact or objects which may otherwise be considered important within the context of a scene. For example, faces may, in some cases, be considered to be of higher interest because they may allow a user to distinguish between various characters and may also convey characteristics such as gender, emotion, age and others. By contrast, in some cases, objects with lower interest may include certain background objects, objects that are positioned far away from a scene viewpoint and objects that are wholly or partially obscured. Interest may be measured using any appropriate technique such as ranks or relative weights assigned to various objects or areas.

Interest information 315 may, in some cases, indicate that interests associated with different objects or areas may vary depending upon different parameters. Such parameters may include, for example, quality of network service information. For example, interest information 315 may indicate that, when transmission conditions are unfavorable, an area corresponding to character's face is designated as the highest interest area in a scene. The interest information 315 may also indicate that, when transmission conditions are more favorable, a different area corresponding to a particular weapon is designated as the highest interest area in a scene.

Intricacy information 316 may include, for example, information that identifies a level of intricacy associated with one or more objects or areas with a scene. For example, a tree in the summer in full bloom may be of higher intricacy then the same tree in winter with no leaves. Intricacy may be measured using any appropriate technique such as ranks or relative weights assigned to various objects or areas.

In some cases, intricacy information 316 may be generated based on an identification of a size that a particular object occupies within a view of a scene. In many cases, this occupied area may be different from the actual size of the particular object. For example, a tablecloth may have a very large size, but its visibility may be wholly or partially obscured by the table when the viewpoint of the scene is from underneath the table. Additionally, if the tablecloth is positioned far away from the viewpoint of the scene, then it may also occupy a smaller scene area than if it were positioned closer to the viewpoint of the scene. The difference between a particular object's occupied scene area and its size may also be due to factors such as an angle of the object with respect to the point-of-view. For example, when the point-of-view of the scene is near the same height as the table, the tablecloth may occupy only a minimal area within the scene even if not obscured by the table itself.

The overall complexity of a scene may be correlated to the occupied screen areas of the objects within that scene. In particular, a highly intricate object may be more likely to raise the overall complexity of a scene when the highly intricate object is occupying a larger scene area. For example, a tablecloth with a highly intricate design may significantly raise scene complexity when it occupies a large scene area (e.g., when viewed from directly above the table and not obscured). However, the same highly intricate tablecloth may only minimally raise scene complexity when it occupies a small scene area (e.g., when obscured by the table or made smaller by the angle of the scene viewpoint).

Thus, complexity information 312 provides information that may assist with adjusting the complexity of a scene associated with content item 310. In some cases, in addition or as an alternative to complexity information 312, other techniques may be employed to assist with adjusting the complexity of a scene. For example, adjustments to scene complexity may be determined by observing changes in image quality associated with adjustments to prior scenes. For example, if it is observed that an object was removed from a scene and that the resulting image had a high image quality, then, in some cases, the removal of the object from the scene may be associated with the high image quality. Thus, in some cases, when the removal of an object is associated with high image quality, it may be estimated that the object has a high level of intricacy. By contrast, if it is observed that an object was removed from a scene and that the resulting image had a low image quality, then, in some cases, the removal of the object from the scene may be associated with the low image quality. Thus, in some cases, when the removal of an object is associated with low image quality, it may be estimated that the object has a low level of intricacy.

In some cases, image quality associated with prior scenes may be determined based on information collected by network monitoring component 375, encoder 360 or by any other appropriate component. The image quality may be determined, for example, based on a comparison of pre-encoded pixel values and post-decoded pixel values for the same transmitted image. In particular, these values may be compared to determine a difference between the pre-encoded and post-encoded pixel values. These differences may be assumed to be based upon a distortion of the pre-encoded image. Thus, higher differences between pre-encoded and post-decoded values may indicate a lower resulting image quality, while lower differences between pre-encoded and post-decoded values may indicate a lower resulting image quality.

Figure 4:
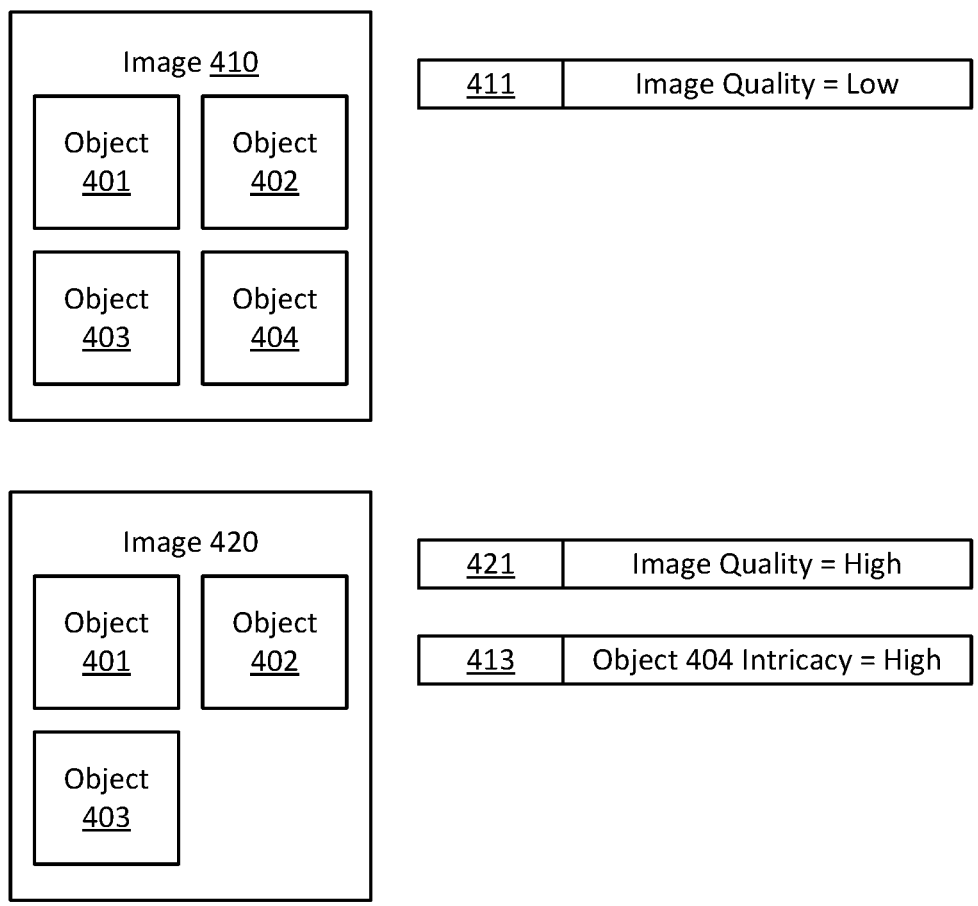
FIG. 4 is a diagram illustrating a first example depiction of image quality information.

Some examples that demonstrate how image quality may be used to estimate the intricacy of an object will now be described with reference to FIGS. 4 and 5. In particular, FIG. 4 depicts a first image 410 and a second image 420. First image 410 includes objects 401, 402, 403 and 404, while second image 420 includes objects 401, 402 and 403. Thus, object 404 is not present in second image 420. In some cases, object 404 may be removed from second image 420 as a result of the scene complexity adjustment techniques described herein. Additionally, in some cases, no complexity adjustment may have been performed on second image 420, and object 404 may simply not be part of the scene from which second image 420 was generated.

As shown in FIG. 4, box 411 indicates that first image 410 is determined to have a low image quality. Additionally, as shown in FIG. 4, box 421 indicates that second image 420 is determined to have a high image quality. These determinations in boxes 411 and 421 may be made, for example, based on image quality analysis techniques such as those described above. Thus, when comparing first image 410 and second image 420, it may be observed that the difference between the contents of these images is that object 404 is not included in second image 420. Additionally, it may be observed that second image 420 has a higher image quality than first image 410. Thus, based on FIG. 4, because the removal of object 404 appears to have, at least in part, triggered a higher image quality in second image 420, it may be determined that object 404 has a high level of intricacy as indicated in box 413.

Figure 5:
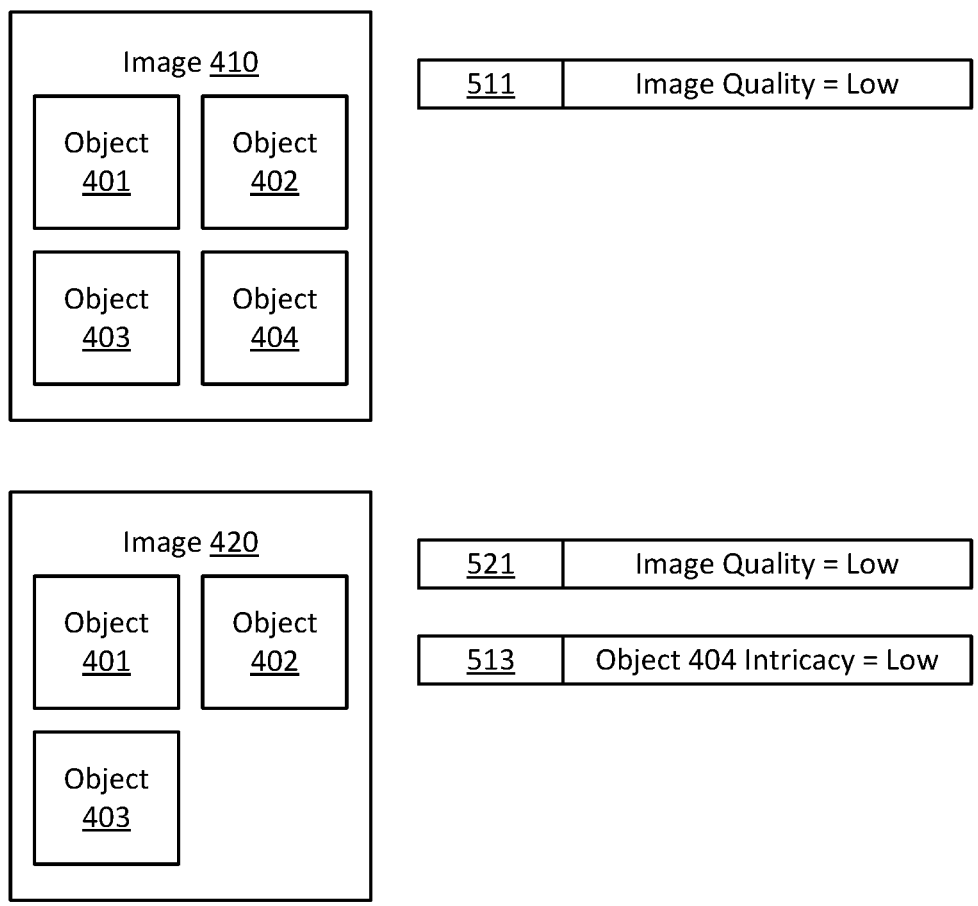
FIG. 5 is a diagram illustrating a second example depiction of image quality information.

In contrast to FIG. 4, a scenario in which the removal of object 404 has a lower impact on image quality is depicted in FIG. 5. In particular, similar to FIG. 4, FIG. 5 depicts first image 410 with objects 401-404 and second image 420 with objects 401-403. Additionally, similar to FIG. 4, FIG. 5 shows that first image 410 is determined to have a low image quality as indicated by box 511. However, unlike in FIG. 4 where second image 420 has a high image quality, FIG. 5 shows that second image 420 is determined to have a low image quality as indicated by box 521. Thus, in FIG. 5, because the image quality is lower in both first image 410 and second image 420, it may be determined that the removal of object 404 had a smaller impact with respect to changing quality between first image 410 and second image 420. Thus, based on FIG. 5, because the removal of object 404 appears not to have triggered a higher quality in second image 420, it may be determined that object 404 has a low level of intricacy as indicated in box 513.

As should be appreciated, the determinations regarding the intricacy of object 404 may, in some cases, be more reliable when first image 410 and second image 420 are determined to be transmitted under the same or similar network quality conditions. Thus, in some cases, complexity adjustment component 340 may compare images that are transmitted within a certain threshold number of images and/or a certain threshold time period with respect to one another. In some cases, when these threshold conditions are met, it may be assumed that network quality conditions may be the same or similar for each different image. Additionally, in some cases, network feedback information of other information may be analyzed in order to determine that compared images are transmitted under similar network quality conditions.

In addition to the network-based techniques set forth above, complexity adjustment component 340 may also receive information from encoding component 360 or other components. Such information may include, for example, information regarding actual output conditions such as an actual realized bandwidth and/or an actual realized encode rate for an image that is being transmitted. Complexity adjustment component 340 may, in some cases, adjust scene complexity based on the actual output conditions. For example, if the actual realized encode rate is too high for low quality of service conditions, then complexity adjustment component 340 may cause additional scene complexity reductions to be made in subsequently transmitted images.

As set forth above, complexity adjustment component 340 may reduce the complexity of a scene by, for example, removing or reducing the intricacy of various objects within the scene. Objects may be selected for removal or intricacy reduction based on any appropriate parameters. In some cases, objects may be selected for removal or intricacy reduction based on their respective distances from a scene viewpoint. For example, in some cases, objects that are further away from the scene viewpoint may be removed or reduced in intricacy. Additionally, in some cases, objects may be selected for removal or intricacy adjustment based on their respective levels of interest. For example, in some cases, the less interesting objects in a scene may be removed or reduced in intricacy. Furthermore, in some cases, objects may be selected for removal or intricacy adjustment based on their respective levels of intricacy. For example, in some cases, the more intricate objects in a scene may be removed or reduced in intricacy.

In addition to the above examples, there are some cases in which objects may be selected for removal or intricacy reduction based on a combination of parameters. For example, in some cases, objects in a scene that are both the least interesting and the most intricate may be the most likely to be selected for removal or intricacy reduction. Objects that meet this combination of parameters may, in some cases, be considered high value targets because they may cause larger reductions in overall scene complexity while also having a smaller impact on the overall interest level of the scene. By contrast, in some cases, objects in a scene that are both the most interesting and the least intricate may be the least likely to be selected for removal or intricacy reduction. Objects that meet this combination of parameters may, in some cases, be considered low value targets because they may cause smaller reductions in overall scene complexity while also having a higher impact on the overall interest level of the scene.

Figure 6:
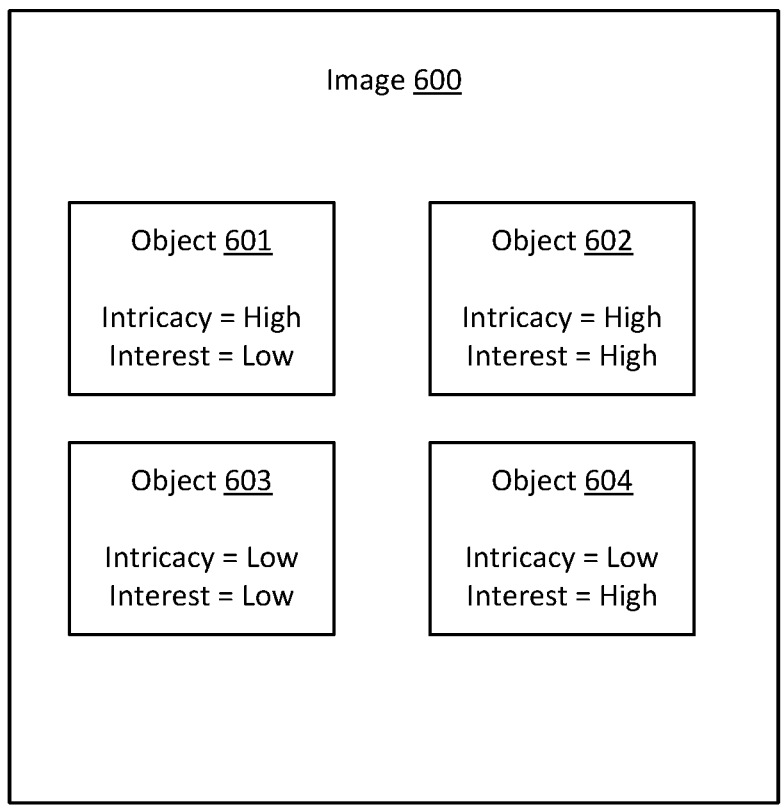
FIG. 6 is a diagram illustrating an example image with complexity information in accordance with the present disclosure.

Some example techniques for adjusting the complexity of a scene will now be described in detail with reference to FIGS. 6-9. In particular, FIG. 6 depicts a scene 600 that includes objects 601, 602, 603 and 604. Additionally, FIG. 6 indicates the interest and intricacy of objects 601-604. In particular, object 601 has high intricacy and low interest, object 602 has high intricacy and high interest, object 603 has low intricacy and low interest and object 604 has low intricacy and high interest.

Figure 7:
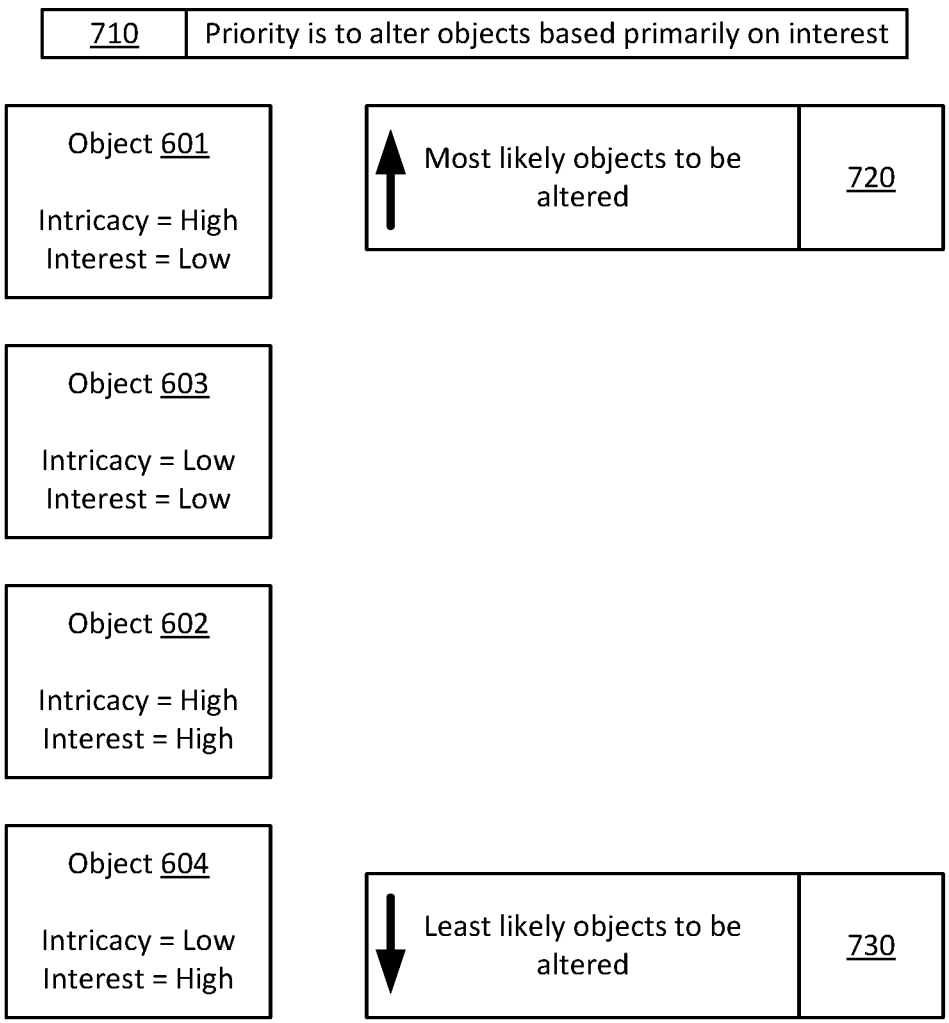
FIG. 7 is a diagram illustrating a first example complexity adjustment priority scheme in accordance with the present disclosure.

Referring now to FIG. 7, box 710 indicates that a priority has been set to reduce scene complexity based primarily on the level of interest of objects in the scene 600. FIG. 7 also depicts an example order in which objects 601-604 may be altered in order to reduce the complexity based on the priority listed in box 710. As set forth above, objects may be altered by, for example, removing the objects from the scene or reducing the complexity of the objects. Box 720 indicates that the objects most likely to be altered are shown at the top of FIG. 7, while box 730 indicates that the objects least likely to be altered are shown at the bottom of FIG. 7.

As shown in FIG. 7, object 601 (high intricacy, low interest) is the most likely object to be altered based on the priority in box 710. As set forth above, object 601 may be considered a high value target for altering because, due to its high intricacy, altering of object 601 may cause a higher impact on the overall complexity of scene 600 than altering of lower intricacy objects 603 and 604. Additionally, due to its low interest, altering of object 601 may be less likely to result in removal of important information from scene 600 than altering of higher interest objects 602 and 604.

Object 603 (low intricacy, low interest) may be the second most likely object to be altered based on the priority in box 710. Similar to object 601, object 603 also has a low interest level. Thus, like object 601, altering of object 603 may also be less likely to result in removal of important information from scene 600. However, unlike object 601, object 603 has a low level of intricacy. Thus, altering of object 603 may have a lower impact on the overall complexity of scene 600. Accordingly, there may be fewer advantages associated with altering object 603 than with altering object 601.

Object 602 (high intricacy, high interest) may be the third most likely object to be altered based on the priority in box 710. Unlike objects 601 and 603, object 602 has a high interest level. Thus, altering of object 603 may be more likely to result in removal of important information from scene 600. Accordingly, based on the priority in box 710, it may be less desirable to alter object 602 than to alter objects 601 and 603. However, it should also be appreciated that object 602 has a high level of intricacy. Thus, even though it may result in removal of important information, altering of object 602 may also be advantageous in the sense that it may cause a higher impact on the overall complexity of scene 600.

Object 604 (low intricacy, high interest) is the least likely object to be altered based on the priority in box 710. As set forth above, object 604 may be considered a low value target for altering because, due to its low intricacy, altering of object 604 may cause a lower impact on the overall complexity of scene 600 than altering of higher intricacy objects 601 and 602. Additionally, due to its high interest, altering of object 604 may be more likely to result in removal of important information from scene 600 than altering of lower interest objects 601 and 603.

Figure 8:
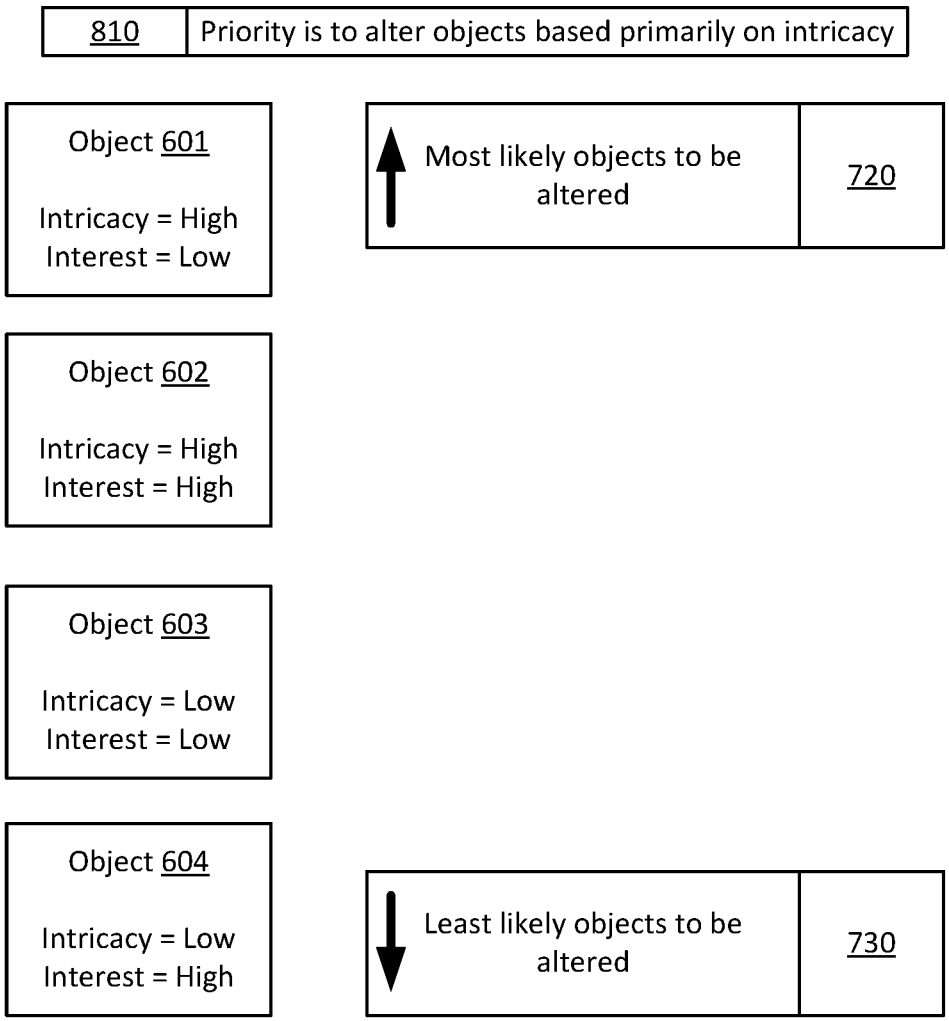
FIG. 8 is a diagram illustrating a second example complexity adjustment priority scheme in accordance with the present disclosure.

Referring now to FIG. 8, a different strategy for reducing scene complexity will now be described in detail. In particular, box 810 of FIG. 8 indicates that a priority has been set to reduce scene complexity based primarily on the level of intricacy of objects in the scene 600. This is in contrast to box 710 of FIG. 7, which indicated that the priority was based primarily on the level of interest. As depicted in FIG. 8, the order of likelihood for altering of object 601-604 has changed in comparison to the order depicted in FIG. 7. Object 601 is still the most likely object to be altered, while object 604 is still the least likely object to be altered. However, objects 602 and 603 have now changed places.

In particular, in FIG. 8, object 602 (high intricacy, high interest) is the second most likely object to be altered based on the priority in box 810. Additionally, object 603 (low intricacy, low interest) is the third most likely object to be altered based on the priority in box 810. As should be appreciated, because box 810 indicates a priority based primarily on intricacy, high intricacy object 602 is more likely to be altered than low intricacy object 603. Thus, even though altering of object 602 is more likely to remove important information form scene 600 than altering of object 603, this risk may be acceptable because altering of object 602 may result in a greater impact on overall scene complexity than altering of object 603.

Essentially, as illustrated by FIGS. 7 and 8, there may be various tradeoffs associated with choosing whether to alter objects based primarily on interest (FIG. 5) or based primarily on intricacy (FIG. 6) or based on any other appropriate scheme. In some cases, it may be preferred to alter objects based primarily on interest in situations when there is more of a concern that important information may be inadvertently excluded from a scene. By contrast, in some cases, it may be preferred to alter objects based primarily on intricacy when there is less of a concern that important information may be inadvertently excluded from a scene.

Figure 9:
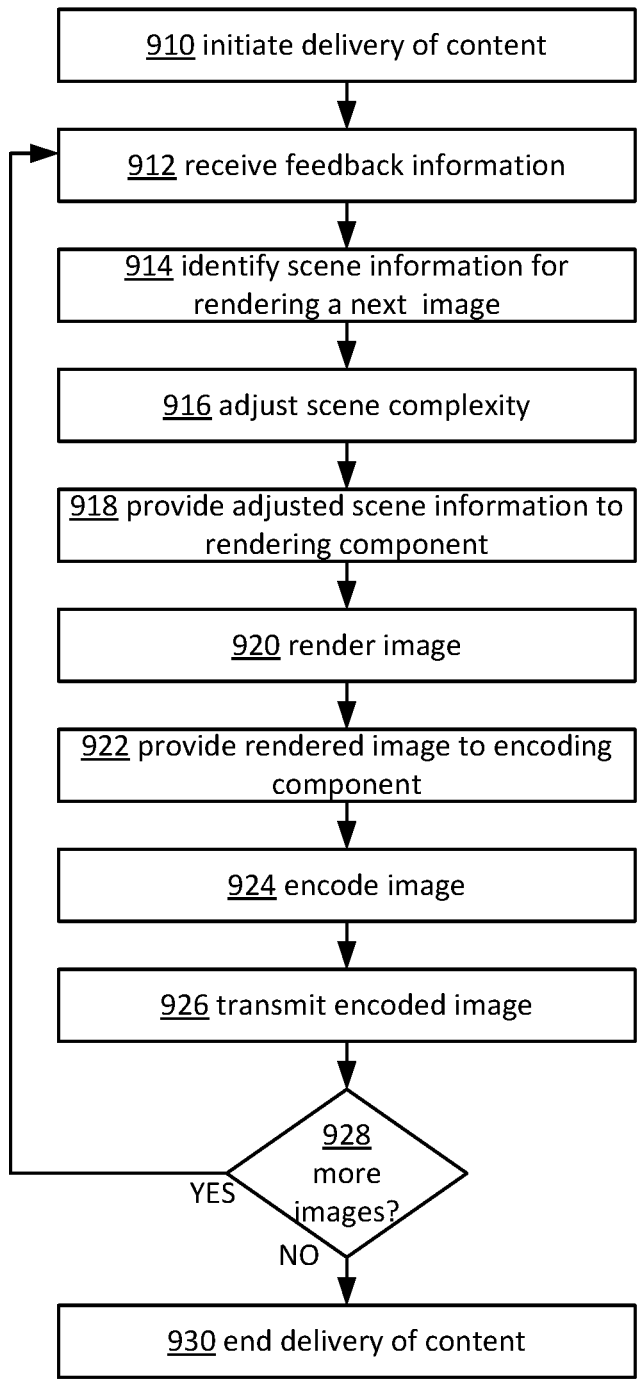
FIG. 9 is a flowchart depicting an example content providing procedure in accordance with the present disclosure.

As should be appreciated, the examples depicted in FIGS. 7-9 are selected merely for illustrative purposes and are non-limiting. Additionally, FIGS. 7-9 are not intended to imply that a content item is required to employ distinct operating modes in which objects are altered either primarily based on interest or primarily based on intricacy. Rather, FIGS. 7-9 merely depict some example techniques for employing some aspects of the disclosed concepts and illustrate some example differences between these techniques. In practice, any combination of the techniques depicted in FIGS. 7-9 and/or any other appropriate techniques may be employed in accordance with the disclosed concepts.

Thus, scene complexity may be adjusted based on quality of service using information such as complexity information 312 as described above. An example method for adjusting scene complexity based on quality of service in accordance with disclosed techniques will now be described in detail with reference to FIG. 9. In particular, at operation 910, delivery of content is initiated. The delivery of content may be initiated, for example, based on a request issued by a particular destination. As set forth above, the content may be delivered using multimedia streaming or any other appropriate technology for delivering content to an end user.

At operation 912, feedback information is received by complexity information adjustment component 340. The feedback information may include, for example, network feedback information regarding a quality of network service with respect to the destination. As set forth above, network feedback information may, for example, include or assist with a determination of a current network quality of service. The network feedback information may include, for example, any information related to changes in available bandwidth, latency, congestion and other factors. In some cases, the network feedback information may include a determination of information related to total bytes and packets that may be received by the particular destination 390. Updated network feedback information may be collected and provided to complexity adjustment component 340 at any repeating or non-repeating (i.e., irregular) intervals. Thus, it is not required that updated network feedback information be received prior to rendering of every image.

The feedback information received at operation 912 may also include, for example, information regarding image quality of previously transmitted images. Information regarding image quality may be collected by, for example, network monitoring component 375 and/or encoding component 360 of FIG. 3 or by any other appropriate component. As set forth above, the image quality may be determined, for example, based on a comparison of differences in value between pre-encoded pixel values and post-decoded pixel values for the same transmitted image.

The feedback information received at operation 912 may also include, for example, information from encoding component 360 or other components. Such information may include, for example, information regarding actual output conditions such as an actual realized bandwidth and/or an actual realized encode rate for an image that is being transmitted.

At operation 914, content item 310 may identify scene information for rendering a next image based on, for example, content information 311. As set forth above, in some cases, an order in which images are displayed and the particular contents and arrangement of information in each image may be dependent on user interaction with the content. For example, in the case of a video game, a game player may, at least in part, determine an order in which images are displayed by determining where to navigate or direct particular characters or objects. As also set forth above, the scene information used to render an image may include two-dimensional or three-dimensional scene information.

At operation 916, the complexity of a scene associated with the information identified at operation 914 is adjusted. The adjustment of scene complexity at operation 916 may include, for example, adjusting any data or information associated with the scene in order to result in an adjustment of scene complexity. Scene complexity may be adjusted by, for example, scene complexity adjustment component 340 of FIG. 3. The complexity of a scene may, for example, be adjusted based at least in part on the feedback information received at operation 912. As set forth above, in some cases, when transmission conditions are unfavorable, scenes may be adjusted by reducing a complexity of the scenes. Reducing scene complexity may, in some cases, allow images to be transmitted at a faster frame rate and/or with a higher display quality than might otherwise be available without complexity adjustment. The complexity of a scene may, for example, be adjusted by changing one or more features of the scene as set forth in detail above.

Various example techniques for reducing scene complexity are described in detail above. These example techniques include, for example, reducing a level of intricacy of various objects in the scene. As another example, one or more objects may be removed from the scene. In some cases, scene complexity may be reduced by lowering a level of movement with respect to a prior scene. Another example technique involves reducing scene complexity by lowering a distance of visibility from a point-of-view associated with the scene. Any combination of the above example techniques or other appropriate techniques may also be employed.

As also set forth above, scene complexity may, in some cases, be adjusted based, at least in part, on complexity information associated with a content item. Complexity information may include, for example, interest information and intricacy information. Interest information may include, for example, information that identifies a level of interest associated with various objects or areas within a scene. Objects with higher interest may include, for example, objects with which a user may be likely to interact or objects which may otherwise be considered important within the context of a scene. Interest information may, in some cases, indicate that interests for different objects or areas may vary depending upon different parameters such as quality of network service information. Intricacy information may include, for example, information that identifies a level of intricacy associated with one or more objects or areas with a scene. For example, a tablecloth with highly detailed textures and colors may be of higher intricacy than a plain white tablecloth.

Scene complexity may also be adjusted based on, for example, information regarding quality of previously transmitted images. This information may be used, for example, to determine or estimate levels of intricacy of various objects that may be included in images that have yet to be transmitted. As set forth above, in some cases, if it is observed that an object was removed from a scene and that the resulting image had a high image quality, then it may be assumed that the object may have had a higher level of intricacy. By contrast, in some cases, if it is observed that an object was removed from a scene and that the resulting image had a low image quality, then it may be assumed that the object may have had a lower level of intricacy.

Scene complexity may also be adjusted based on, for example, information from encoding component 360 or other components. Such information may include, for example, information regarding actual output conditions such as an actual realized bandwidth and/or an actual realized encode rate for an image that is being transmitted At operation 918, adjusted scene information associated with the adjusted scene is provided to rendering component 350. The adjusted scene information provided at operation 918 may include or otherwise reflect the scene complexity adjustments performed at operation 916. At operation 920, rendering component 350 is employed to render the image for transmission to destination 390. As set forth above, rendering component 350 may, for example, generate a resulting two-dimensional image based on the adjusted scene information provided at operation 918. Rendering component 350 may perform well known operations such as, for example, lighting, shading, clipping, transformation, scan conversion, rasterization, texturing and fragment shading.

At operation 922, the output of the rendering component 350, a rendered two-dimensional image, is provided to an encoding component 360 to be encoded for transmission.

At operation 924, the image is encoded. Encoding may be performed by a component such as encoding component 360 of FIG. 3. Any appropriate techniques for encoding of images for transmission may be performed. Encoding component 360 or another component may also perform other appropriate transmission related operations such as data compression. At operation 926, the encoded image is transmitted over a network to destination 390 for display. At operation 928, it is determined if there are any remaining images for display. If so, then the example process may return to operation 912 for performance of the process with respect to the next remaining image. If there are no remaining images, then the content delivery process may be terminated at operation 930.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors
   one or more memories to store a set of instructions, which if executed by the one or more processors, causes the one or more processors to perform operations comprising:
   identifying data included in a video game corresponding to a scene, wherein the video game includes interest information and intricacy information, the interest information identifying a respective level of interest for each of a plurality of objects in the scene the interest information identifying a respective level of interest for each of a plurality of objects in the scene based at least in part on a likelihood of user interaction therewith, the intricacy information identifying a respective level of intricacy for each of the plurality of objects in the scene;
   adjusting, based at least in part on a change in bandwidth of at least one network, the data to result in a reduction to scene complexity associated with the scene, wherein the reduction to the scene complexity comprises removing a first object of the plurality of objects from the scene based at least in part on a first level of interest for the first object identified in the interest information and a first level of intricacy for the first object identified in the intricacy information;
   rendering an image based on the data that is adjusted; and
   transmitting, over the at least one network, the image to a destination.

2. The system of claim 1, wherein the reduction to the scene complexity further comprises reducing an intricacy of a second object of the plurality of objects.

3. The system of claim 1, wherein the operations further comprise receiving information that comprises data indicative of a quality of network service.

4. A method comprising:
   identifying data included in a video game corresponding to a scene, wherein the video game includes interest information and intricacy information, the interest information identifying a respective level of interest for each of a plurality of objects in the scene the interest information identifying a respective level of interest for each of a plurality of objects in the scene, the intricacy information identifying a respective level of intricacy for each of the plurality of objects in the scene;
   adjusting, based at least in part on a change in bandwidth of at least one network, the data to result in a reduction to scene complexity associated with the scene, wherein the reduction to the scene complexity comprises removing a first object of the plurality of objects from the scene based at least in part on a first level of interest for the first object identified in the interest information and a first level of intricacy for the first object identified in the intricacy information;
   rendering an image based on the data that is adjusted; and
   transmitting, over the at least one network, the image to a destination.

5. The method of claim 4, wherein the reduction to the scene complexity further comprises reducing an intricacy of a second object of the plurality of objects.

6. The method of claim 4, further comprising receiving information that comprises data indicative of a quality of network service.

7. The method of claim 4, wherein the respective level of interest for each of the plurality of objects in the scene is based at least in part on a likelihood of user interaction therewith.

8. A non-transitory computer-readable medium having stored thereon a set of instructions, which if performed by one or more processors, causes the one or more processors to perform operations comprising:
   identifying data included in a video game corresponding to a scene, wherein the video game includes interest information and intricacy information, the interest information identifying a respective level of interest for each of a plurality of objects in the scene the interest information identifying a respective level of interest for each of a plurality of objects in the scene, the intricacy information identifying a respective level of intricacy for each of the plurality of objects in the scene;

adjusting, based at least in part on a change in bandwidth of at least one network, the data to result in a reduction to scene complexity associated with the scene, wherein the reduction to the scene complexity comprises removing a first object of the plurality of objects from the scene based at least in part on a first level of interest for the first object identified in the interest information and a first level of intricacy for the first object identified in the intricacy information;

rendering an image based on the data that is adjusted; and transmitting, over the at least one network, the image to a destination.

9. The non-transitory computer-readable medium of claim 8, wherein the reduction to the scene complexity further comprises reducing an intricacy of a second object of the plurality of objects.

10. The non-transitory computer-readable medium of claim 8, wherein the operations further comprise receiving information that comprises data indicative of a quality of network service.

11. The non-transitory computer-readable medium of claim 8, wherein the respective level of interest for each of the plurality of objects in the scene is based at least in part on a likelihood of user interaction therewith.

* * * * *